United States Patent [19]
Roche et al.

[11] Patent Number: 5,188,394
[45] Date of Patent: Feb. 23, 1993

[54] POSITIONABLE TIRE SCRAPER FOR DUAL TIRES

[76] Inventors: Mortimer P. Roche, 8516 Blounts La., Fulton, Md. 20759; Ademar Scarpelli, 4910 Riverton La., Bowie, Md. 20715

[21] Appl. No.: 737,490

[22] Filed: Jul. 30, 1991

[51] Int. Cl.[5] ............................................. B60S 1/68
[52] U.S. Cl. ..................................... 280/856; 172/606
[58] Field of Search ..................... 280/158.1, 855, 856; 72/561, 563, 564, 606, 610

[56] References Cited

U.S. PATENT DOCUMENTS

| | | | |
|---|---|---|---|
| 1,840,070 | 1/1932 | Webber | 280/855 |
| 2,667,362 | 1/1954 | Woodward et al. | 280/856 X |
| 3,080,196 | 3/1963 | Darby | 280/43.14 |
| 3,788,683 | 1/1974 | Rumell | 280/43.14 X |
| 4,371,307 | 2/1983 | Mattson | 172/610 X |
| 4,940,110 | 7/1990 | Svensson et al. | 280/43.14 X |

FOREIGN PATENT DOCUMENTS

| | | | |
|---|---|---|---|
| 982189 | 1/1976 | Canada | 280/856 |
| 812153 | 8/1951 | Fed. Rep. of Germany | 280/158.1 |
| 2319884 | 10/1974 | Fed. Rep. of Germany | 280/856 |
| 1059883 | 3/1954 | France | 280/855 |
| 0124504 | 7/1985 | Japan | 280/856 |

*Primary Examiner*—Brian Johnson

[57] ABSTRACT

A tire scraper for removing mud from a vehicle having dual tires, includes a plurality of scraper bars, each carrying a plurality of brush assemblies. An actuator moves the pivotal support member between a first retracted position and a second deployed position.

11 Claims, 2 Drawing Sheets

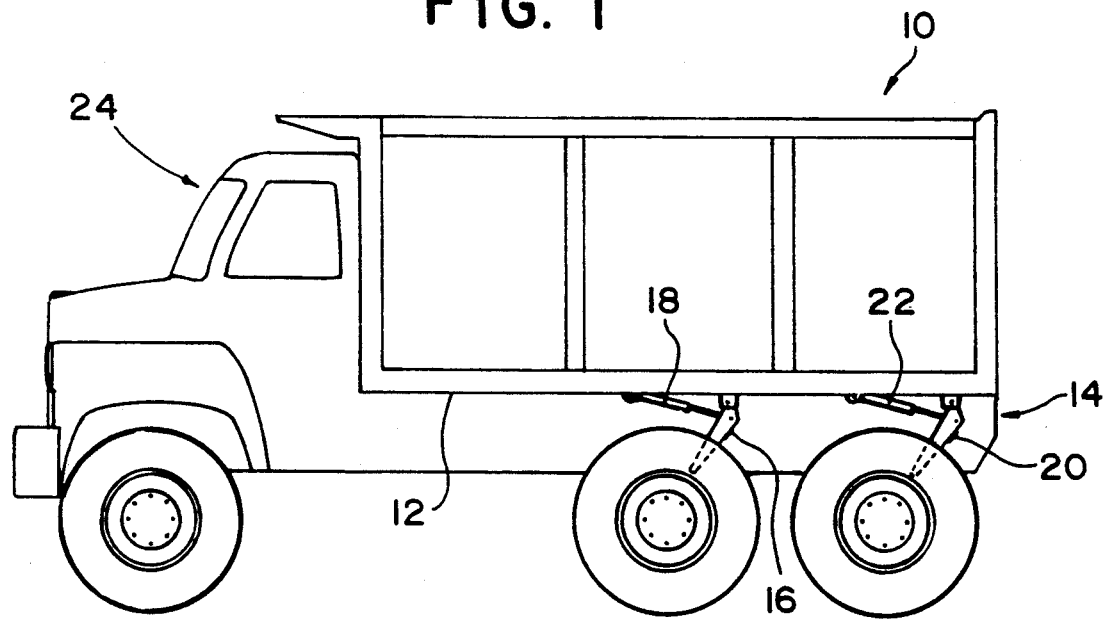
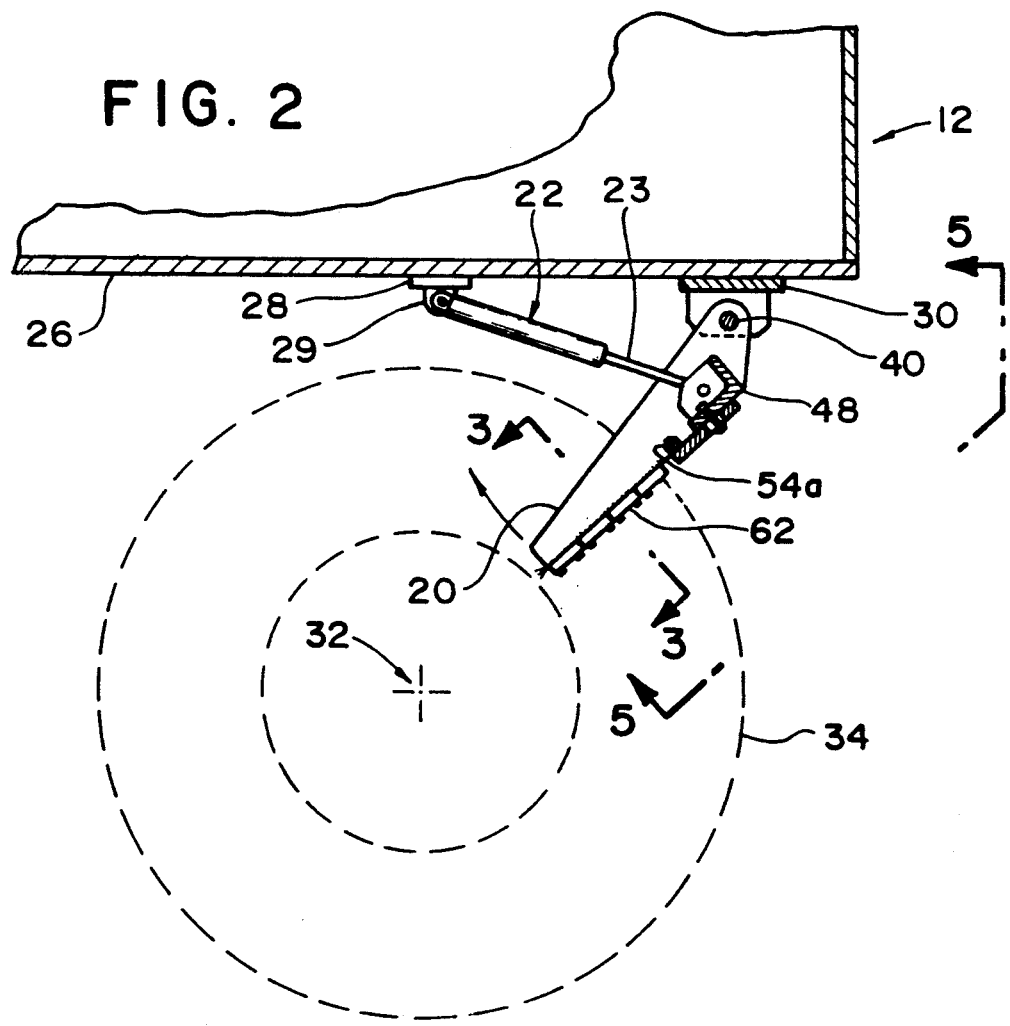

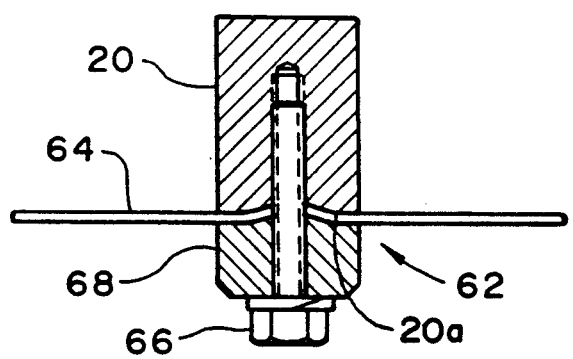
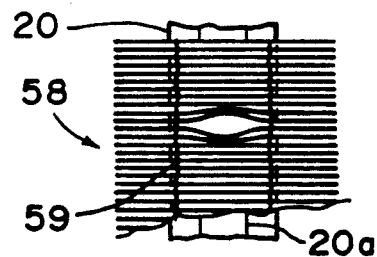
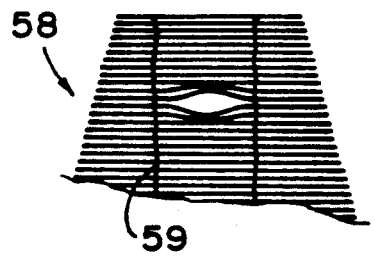
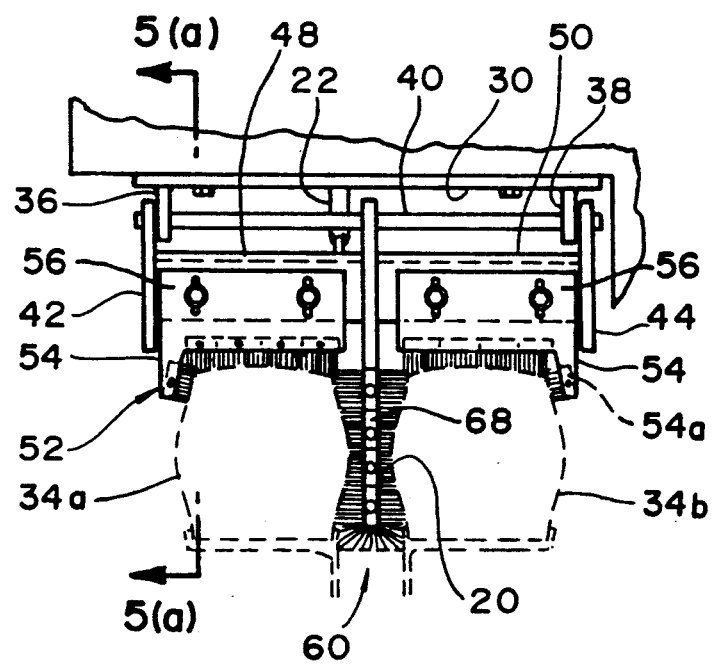
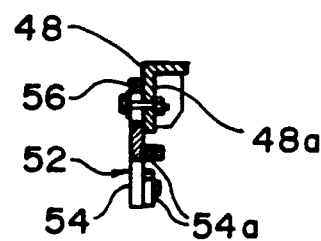
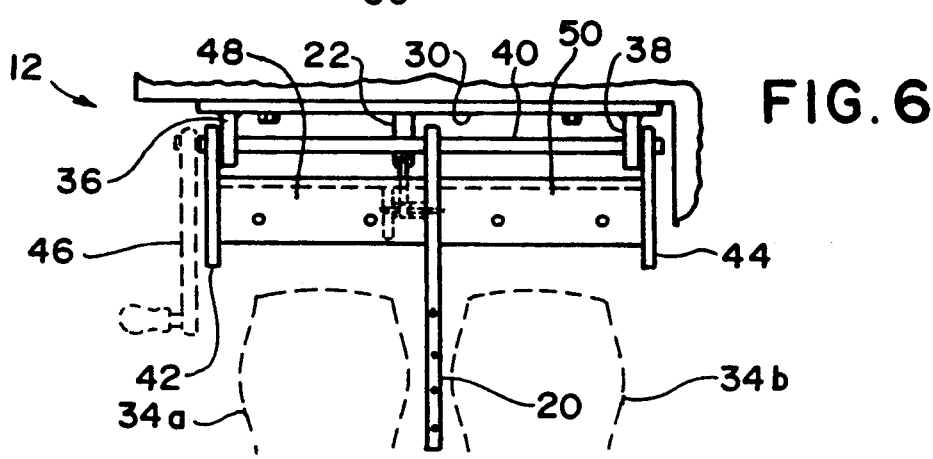

POSITIONABLE TIRE SCRAPER FOR DUAL TIRES

BACKGROUND OF THE INVENTION

1. Field of the Invention

The present invention relates generally to automotive accessories and, more specifically, to a tire scraper for removing mud from the tires of a truck.

1. Description of the Related Art

Trucks that are licensed for road travel are sometimes required to travel off-road to a particular job site, where they may experience muddy conditions. In the case of trucks having dual wheels (meaning two wheels at each end of each rear axle), these are particularly susceptible to mud build-up between the tires mounted on the dual wheels. Moreover, the outer circumference of each tire is susceptible to mud build-up, due to the fact that a deep tread may be provided o the tire.

A mud and gravel mix is frequently encountered at a construction site, and this mixture is particularly difficult to remove from the tires before the vehicle is placed back on the road.

Many state and local governments have passed ordinances that prohibit trucks from driving onto a paved road with muddy tires. It is not uncommon for these ordinances to provide stiff penalties in the way of fines for truck drivers/owners. When the truck driver is about to drive onto a paved road from a construction site, he must stop his vehicle and, using a stick, board or other suitable object, he must scrape the mud and gravel off the circumference of the tires and from between the tires of the dual wheels to avoid the penalties. This process is time consuming and ultimately not very effective.

SUMMARY OF THE INVENTION

An object of the present invention is to provide a tire scraper which is relatively simple in construction and cost effective to produce.

Another object of the present invention is to provide a tire scraper which minimizes the amount of time required to make the tires of a vehicle clean before driving on a paved road.

Another object of the present invention is to provide a tire scrape which is capable of being stowed in an inoperative position and deployed in an operative position with a minimal amount of work for the vehicle driver.

These and other objects of the invention are met by providing a tire scraper for removing mud from a vehicle having dual tires, including scraper means for removing mud from the dual tires, a support member mounted on the vehicle adjacent the dual tires and having the scraper means mounted thereon, and an actuator for moving the support member and thus the scraper means between a first, retracted position and a second, deployed position in which the scraper means is juxtaposed the dual tires while the dual tires are rotating.

These and other features and advantages of the tire scraper of the present invention will become more apparent with reference to the following detailed description and drawings.

BRIEF DESCRIPTION OF THE DRAWINGS

FIG. 1 is a side elevational view of a vehicle having the tire scraper according to the present invention mounted thereon;

FIG. 2 is an enlarged vertical sectional view, showing a portion of the tire scraper according to FIG. 1;

FIG. 3 is a sectional view taken along line III—III of FIG. 2;

FIGS. 4(a) and 4(b) are side elevational views of wire brush segments which form at part of the present invention;

FIG. 5 is a rear elevational view of the tire along line 5—5 of FIG. 2 scraper showing brush assemblies attached thereto and positioned in juxtaposition to the tires;

FIG. 5(a) is a sectional view taken along line 5(a)—5(a) of FIG. 5; and

FIG. 6 is a side elevation view of the tire scraper of FIG. 5 with the brush assemblies removed for illustration.

DETAILED DESCRIPTION OF THE PREFERRED EMBODIMENTS

Referring now to FIG. 1, a vehicle such as a tandem rear axle dump truck 10 has a dump bed 12 to which is connected on the underside thereof a tire scraper apparatus 14 according to the present invention. The scraper apparatus 14 is illustrated in a deployed position in which a first scraper bar or element 16 is actuated downwardly to extend between a pair of dual tires by extension of a fluid pressure (hydraulic or pneumatic) cylinder 18. Similarly, for the rear-most axle, a second scraper bar or element 20 is actuated downwardly by a fluid pressure cylinder 22.

The cylinders 18 and 22 may be actuated by a compressed air source (not shown) or a hydraulic fluid source (not shown) as controlled by a panel switch or other suitable means in the cab 24 of the truck 10.

Referring now to FIG. 2, which is an enlarged, vertical sectional view taken at the rear-most axle, the dump bed 12 includes a lower frame member 26 to which are welded or otherwise suitably attached a pair of steel support bars 28 and 30, which run essentially parallel to the axis of rotation 32 of the dual tires, illustrated in FIG. 2 as the broken line 34.

As further illustrated in FIGS. 5 and 6, the rear-most support bar 30 has a pair of downwardly extending arms 36 and 38, each having a transverse bore so as to collectively define a clevis through which a pivot pin 40 is pivotally mounted. The pin carries the scraper bar 20 at a medial portion of the pin 40. The scraper bar 20 is provided with a plurality of brush segments (to be described below). The scraper bar 20 extends between the two tires 34a and 34b (as seen in FIGS. 5 and 6), while a pair of shorter, side scraper bars 42 and 44 are provided on opposite sides of the dual tire assembly.

By rotating the pin 40, the scraper bars 20, 42 and 44 can be moved from a stowed position in relative proximity to the frame member 26 of the dump bed 12 to a deployed position in which the bars move in between and juxtaposed to the tires 34a and 34b. Rotation or actuation of the pin 40 may be performed manually by the use of a crank 46 (shown in broken lines in FIG. 6) or by the cylinder 22. The cylinder 22 has one end pivotally mounted to the frame member 26 through the support bar 28 and a downwardly extending arm 29 connected to the support bar 28, and an opposite end pivotally connected to the scraper bar 20. As the extendable arm 23 of the cylinder 22 is extended (through the application of pressurized fluid), the pin 40 is caused to rotate counter-clockwise (as viewed in FIG. 2) so that the scraper bar assembly which includes scraper bars 20, 42 and 44 and there corresponding brush segments likewise rotate in a counter-clockwise direction. Since this actuation can be performed from the cab of the truck using a cylinder 22, the cylinder is preferred over the crank 46, which would require one individual to manipulate the crank while the other individual drove the truck to rotate the wheels.

A pair of support plates 48 and 50 (FIG. 5) are mounted respectively between the bars 42 and 20, as well as between bars 44 and 20. Any suitable means, such as welding, may be used to rigidly connect the support plates 48 and 50 between the scraper bars 42, 44 and 20. As shown in FIG. 2, the support plate 48 may be made of angle-steel. As shown in FIG. 5(a), the plate 48 has a portion 48a to which a brush assembly 52 is adjustably mounted via fastening bolts received in slots, as clearly shown in FIG. 5. The brush assembly 52 includes a plurality of brush segments 54 which are individually mounted on a backing plate 56. The backing plate may be provided with slots so as to provide for either vertical or horizontal adjustment of the position of the brush segments 54. Each brush segment 54 is attached to the backing plate 56 by means of threaded fasteners 54a, and each includes a plurality of bristles 58 which are preferably made of heavy wire coated in plastic. As shown in FIGS. 4(a) and 4(b), the length of the bristles is selected or cut according to the desired shape of the overall brush assembly. For example, referring to FIG. 5, it can be seen that the brush assembly 60 mounted on the bar 20 has bristles chosen to have a length which conforms to the profile of the two tires 34a and 34b, thus constituting an hour-glass shape. On the other hand, the bristles of the brush assembly 52 have a substantially straight profile in order to correspond to the circumference of the tire and to an outer edge of the tire.

Referring to FIG. 3, a brush segment 62 of the brush assembly 60 includes bristles 64 which extend in a radially outward direction relative to the bar 20. A threaded fastener 66, such as a bolt, passes through a support block 68 of the brush segment 62 and into a threaded bore provided in the bar 20. During manufacture, the bristles can be attached to the support block 68 by applying a thermoplastic o thermosetting polymeric material over the bristles which are held on the surface of the block 68 in parallel alignment when the polymeric material hardens. Any conventional adhesive material can be used. When the polymeric material hardens, the bristles are placed between the corresponding scraper bar and support block 68. When the bolt is tightened, the bristles are forced into a groove 20a formed in the corresponding bar 20 so that the bristles are prevented from rotating.

Other types of brushes having other types of bristles may be employed. Moreover, the present invention can be practiced by providing a minimal amount of structure, such as employing only the center bar 20 which may be of greater width, so as to touch the two tires 34a and 34b simultaneously at their closest point to each other. This would have the tendency to remove most of the mud between the tires without having to use bristles. Thus, the structure illustrated in FIG. 6, having the brush assemblies removed from the sake of illustration, can be viewed as another embodiment of the invention in which only a middle bar 20 is mounted on a pivot pin 40. The addition of side bars 42 and 44 and the brush assemblies represent a particularly preferred embodiment of the present invention.

Also, while the present invention has been described in detail with respect to a single tire scraper, it should be readily understood that a tire scraper would be provided on each set of dual wheels provided on the rear axles of the truck.

Numerous modifications and adaptations of the present invention will be apparent to those so skilled in the art and thus, it is intended by the following claims to cover all such modifications and adaptations which fall within the true spirit and scope of the invention.

What is claimed is

1. A tire scraper for removing mud from a vehicle having dual tires, comprising:
   a scraper element;
   a pivotal support member mounted on the vehicle adjacent the dual tires, the pivotal support member including a pivot pin having a pivot axis parallel to a rotation axis of the dual tires and being mounted above the dual tires, the pivot pin rotatably mounted between a pair of support arms connected with and extending downward from a frame member of the vehicle, the scraper element including means for detachably coupling a portion thereof to the pivotal support member; and
   an expandable length actuator arm having a first end connected to the vehicle above the dual tires and a second end connected to the pivotal support member, whereby the pivotal support member and thus the scraper element are pivoted between a first, retracted position and a second, deployed position when the length of the actuator arm is expanded.

2. A tire scraper according to claim 1, wherein the scraper element comprises a medial scraper bar mounted on the pivot pin and movable between the dual tires.

3. A tire scraper according to claim 2, wherein the medial scraper bar includes at least one brush segment mounted thereon.

4. A tire scraper according to claim 3, wherein the at least one brush segment includes a plurality of brush segments, each having a plurality of bristles which collectively conform to a profile defined by opposing surfaces of the dual tires.

5. A tire scraper according to claim 1, wherein the scraper element comprises a medial scraper bar movable between the dual tires, and two outer scraper bar's one being disposed on an outside of a corresponding one of the dual tires.

6. A tire scraper according to claim 5, further comprising a brush assembly mounted on each of the medial scraper bar and the two outer scraper bars.

7. A tire scraper according to claim 6, wherein each brush assembly includes a plurality of brush segments, each brush segment including a support block connected to one of the scraper bars, a plurality of bristles carried by the support block, and means for fastening each brush segment to a corresponding one of the medial scraper bar and the two outer scraper bars.

8. A tire scraper according to claim 1, wherein the actuator arm comprises a fluid pressure cylinder.

9. A tire scraper according to claim 2, wherein the scraper element further includes two outer scraper bars, one being disposed on an outside of one of the dual tires.

10. A tire scraper according to claim 9, further comprising a brush assembly disposed on each of the medial scraper bar and the two outer scraper bars.

11. A tire scraper according to claim 10, wherein the brush assemblies are mounted on a support plate between the two outer scraper bars and including means to provide adjustment thereof.

* * * * *